Aug. 2, 1955          A. C. HECK          2,714,308
MECHANICAL MUD TESTING DEVICE

Filed Jan. 18, 1952          2 Sheets-Sheet 1

Alfred C. Heck
INVENTOR.

BY *Clarence A. O'Brien*
*and Harvey B. Jackson*
Attorneys

Aug. 2, 1955  A. C. HECK  2,714,308
MECHANICAL MUD TESTING DEVICE
Filed Jan. 18, 1952  2 Sheets-Sheet 2
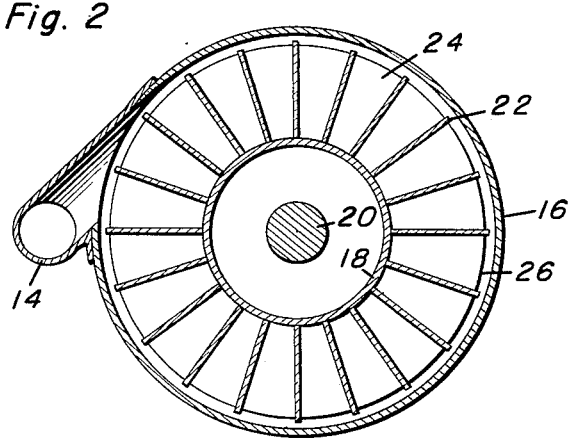
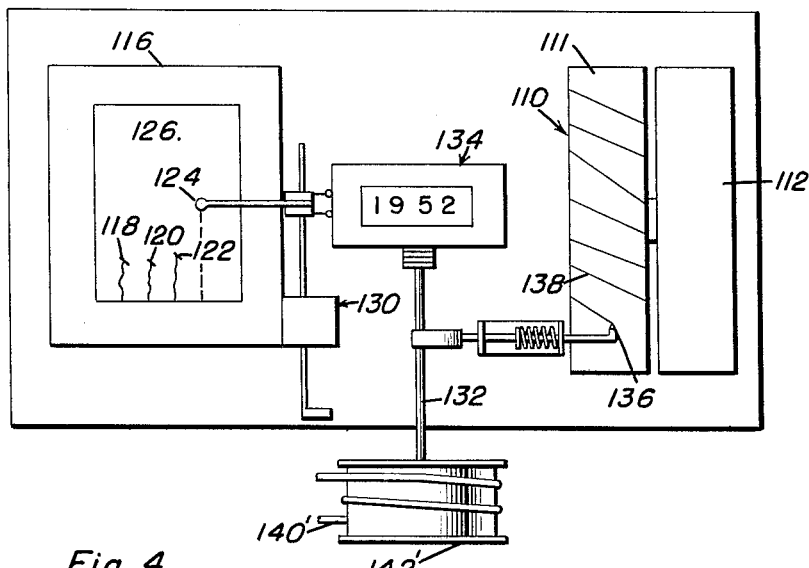
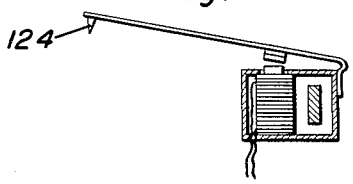
Alfred C. Heck
INVENTOR.

United States Patent Office 2,714,308
Patented Aug. 2, 1955

2,714,308

MECHANICAL MUD TESTING DEVICE

Alfred C. Heck, Odessa, Tex.

Application January 18, 1952, Serial No. 267,024

9 Claims. (Cl. 73—153)

This invention relates to a mechanical mud testing device and particularly to a device for logging a well to indicate the hydrocarbon content of the various strata through which the well passes.

In drilling wells, particularly wells for oil and gas, it is very desirable to know the gas or oil content of a strata through which the well passes. Many means have been devised for measuring the various components of the hydrocarbons in the various strata and making records of these components together with the strata from which they are found. The heretofore known devices for so logging wells have been cumbersome, inaccurate and incapable of ready operation. The present invention provides a compact, automatic analyzing and recording device for the purpose of detecting hydrocarbon content of strata penetrated by the drilling bit, together with the actual depth at which the strata being analyzed is found.

It is accordingly, an object of this invention to provide a mechanical device for testing the mud in a well.

It is a further object of this invention to provide a log of the hydrocarbon content of the various strata through which the well passes.

It is a further object of this invention to provide a logging device analyzing the different portions of the mud from the well and simultaneously recording all of the analysis on a single record sheet.

Other objects and many of the attendant advantages of this invention will be obvious from the following specification taken in conjunction with the accompanying drawings.

Fig. 2 is a sectional view taken along the lines 2—2 of Fig. 1.

Fig. 3 is a detailed view of the recorders and actuating mechanism therefor shown in Fig. 1.

Fig. 4 is a detailed view of a recorder pen.

Figure 1:
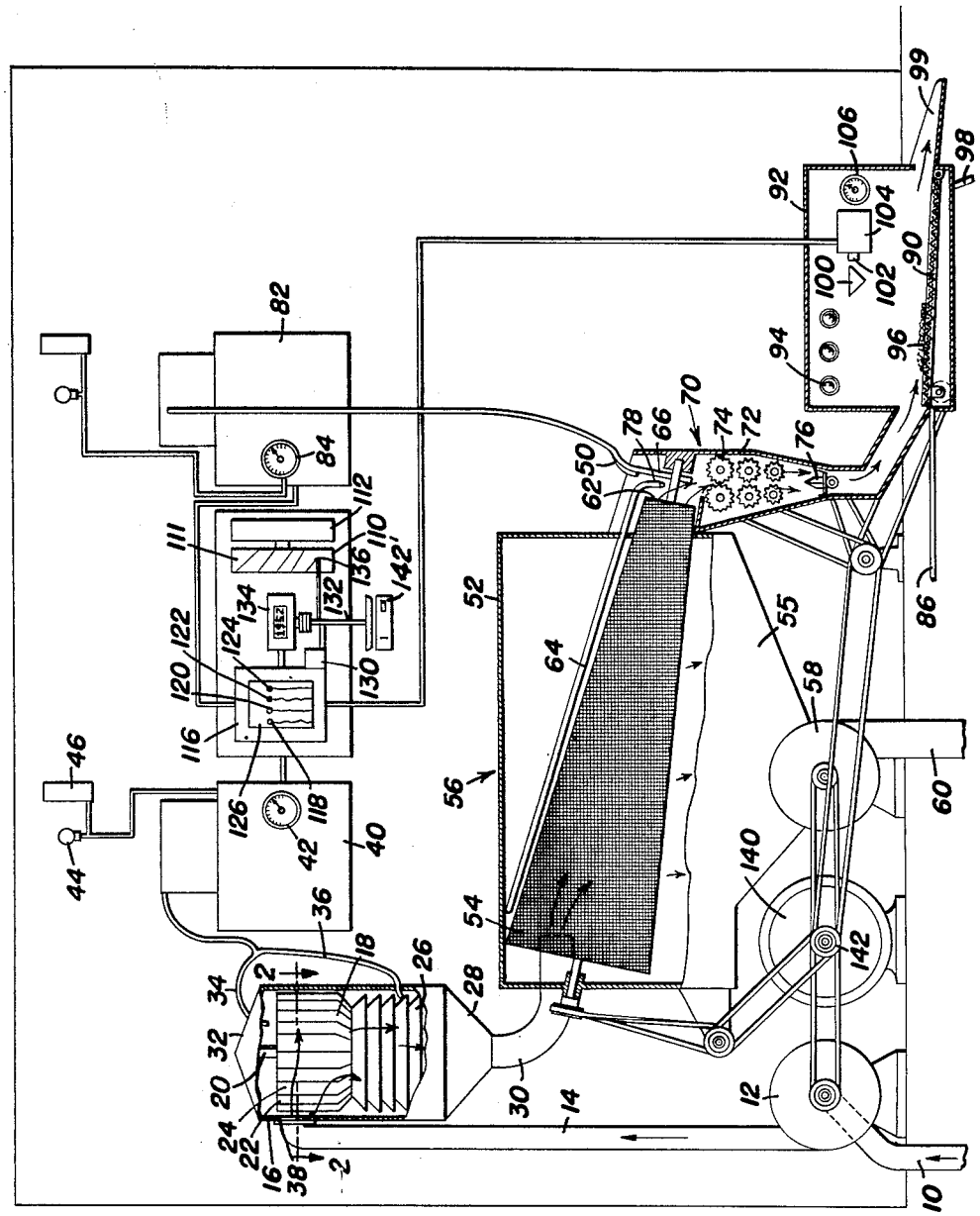
Fig. 1 is a view of an embodiment of the invention.

In the exemplary embodiment of the invention the returning mud, including the drill cuttings and other debris returning from the well, returns through a pipe 10 to a pump 12 which delivers the mud through a delivery pipe 14 to a chamber 16.

The chamber 16 is substantially cylindrical in shape, although, as is obvious, it may be constructed in any desired shape. A cylinder 18 mounted on an axial shaft 20 is provided with a plurality of vanes 22 which provide a plurality of vertically extending wedge-like segmental cells 24. Immediately below the cylinder 18 are a plurality of baffles 26 and the bottom of the chamber 16 is substantially conical in shape and is provided with an outlet pipe 30. A gas proof type top 32 is also preferably conical in shape. A plurality of tubes 34 and 36 are connected into the chamber 16 for collecting any gases or hydrocarbon material liberated therein.

A pump 12 delivers the well mud through the pipe 14 into an opening 38 which delivers the mud against the side of the cylinder 18 so that the cylinder is rotated by the impact of the mud thereagainst. The vanes 22 of the cylinder 18 cut the stream of mud into a plurality of slugs, which then flow out of the pockets 24 and drop down across the baffles 26. The separator chamber is logically known as a gas and mud separator and operates to agitate the well mud so that the gases or hydrocarbons contained therein are freed from the mud content and are collected by the tubes 34 and 36. Suitable pumping devices (not shown) are connected in operative relation to tubes 34 and 36 and the gas collected from the gas and mud chamber is delivered to a gas analyzer 40. A gas analyzer 40 is of the well known type constantly used in this art and may well be of the type disclosed by Metcalf's patent, Serial No. 2,393,650; issued January 29, 1946.

The gas or hydrocarbon analyzer 40 is preferably of the bridge type, as is the type noted above and has an indicator 42 which continuously indicates the amount of the hydrocarbons passing through the analyzer. Preferably, the device is provided with an indicator 44 which is connected in the form of a light to be energized when the dial 42 indicates a predetermined quantity of hydrocarbons. Likewise, a bell 46 is connected so that if an unusual quantity of hydrocarbons should be indicated, not only will the light light, but the bell will ring to make sure that the operator is aware of the existence of the predetermined amount of hydrocarbon passing through the analyzer.

The well mud which has been liberated of its occluded gases in the chamber 16 passes through the conduit 30 into a shale shaker 56 which may be of any well known type.

The shale shaker 56, as herein shown, comprises a substantially closed chamber 52 preferably constructed of stainless steel or other very durable material. Mounted within the chamber 52 is a substantially conical screen 54 also preferably constructed of very durable materials such as stainless steel. The mud delivered through the conduit 30 into the screen 54 is washed and vibrated so that the mud itself is passed through the screen and falls into a conical bin-like hopper 55 in the bottom of the chamber 52 and is delivered by pump 58 to a conduit 60 where it may be returned to the well, or to storage for use in the well.

The drill cuttings contained in the mud are separated out by means of the screen 54 and pass into the lower end 62 of the screen 54. A water conduit 64 is mounted along the screen 54 and is preferably provided with jets for constantly washing the screen 54. Likewise, the conduit 64 has a jet 78 for delivering a jet of washing fluid to the cuttings delivered from the end 62 of the screen 54.

A crusher 70 comprises a housing 72 in which is mounted a plurality of pairs of crushing rolls 74 herein shown as three in number, with the rolls decreasing in size from the top to the bottom. The cuttings together with the stream of water from the jets 78 pass down through the crushing rolls and the cuttings are crushed to a relatively small size, such as the size of small sand grains. Crushed cuttings from the rolls 74 are delivered to a set of rotating knife blades 76 which cut and agitate the cuttings to an even smaller size, but particularly agitate the cuttings to free or liberate them from occluded gases therein. The gases liberated by the crushing and agitating of the cuttings are collected by means of tubes 50 and 66 and delivered to a hydrocarbon analyzer 82 preferably identical with the analyzer, 40.

The analyzer 82 is likewise provided with an indicator 84 for continuously indicating the quantity of the hydrocarbons being analyzed by analyzer 82. Analyzer 82 is likewise preferably provided with the various signal devices so that unusual quantities of hydrocarbons will be called to the attention of the operator.

The crushed cuttings extending below the agitator 76 are supplied with an additional stream of water from the pipe 86 and are carried onto a vibrating screen 90.

The vibrating screen 90 is maintained in a substantially light tight container 92. A plurality of ultra-violet generators, herein shown as ultra-violet lights 94 are mounted within the container 92 in proximity with the cuttings 96 on the vibrating screen 90. The washing water entering with the cuttings 96 passes through the screen 90 and escapes through the outlet pipe 98. The cuttings 96 pass across the screen 90 and are discharged through an opening 99.

The irradiation of the cuttings 96 by ultra-violet source 94 produced fluorescence of the cuttings 96. The color and intensity of the fluorescence is determined by the minerals or other materials present in the cuttings. It is known that the fluorescent color of the hydrocarbons provides a substantially narrow band and the present invention takes advantage of this fact to concentrate and filter out the luminescence resulting from the fluorescence of the hydrocarbon particles so that the hydrocarbons can be quantitatively measured.

Filtering device comprises a prism 100 which has one side thereof, exposed to the fluorescent surface of the cuttings 96 and is so arranged that the prism casts a spectrum of the various light entering thereinto.

The prism 100 is so arranged that the band of the spectrum corresponding to the fluorescence of the hydrocarbons falls into an opening 102 of a light intensity recorder 104. A light intensity recorder 104 is provided with an indicating dial 106 which continuously shows the intensity of the light and is preferably calibrated in hydrocarbon content of the cuttings on the screen 90.

The light intensity recorder is a device which is common on the market, and may well be of the type shown in Campbell patent, Serial No. 2,361,261; issued October 24, 1944.

A time rate recorder drum 110 is driven by a clock 112. A paper tape 111 is mounted on the drum 110 and rotates therewith.

A wire 140, Fig. 3, is attached to the kelly-head of the drill and as the drill pipe moves downward the wire turns the shaft 132 through pulley 142' of the depth recorder 134 which constantly indicates the total accumulated depth. Rotation of shaft 132 actuates a pen 136 which produces a record line on the tape 111. The movement of the kelly-head a distance of one foot will produce a predetermined calibrated stroke of the pin 136 which in connection with the time rate of movement indicates the drilling rate.

In order to provide a log of the hydrocarbon contents of the various strata through which the well passes, a continuous record is made of the indications of the various recording devices or indicating devices such as 42, 84 and 106 and preferably is also recorded with the exact depth at which the cuttings originated. For this purpose, a recorder 116 is provided having a plurality of pens 118, 120, 122 and 124. Record sheet 126 is mounted in the recorder 116 and is preferably of the roller type being mounted in the top of the machine and rolled onto a receiving roll in the bottom of the machine. However, any suitable recording device may be utilized. A pen 118 is connected to the indicator 42 and continuously makes a record on the paper strip 126 of the instantaneous indications of the indicator 42. Similarly, pen 122 is connected to the intensity meter 104 for recording the intensity indicated on the indicator 106.

In order to properly integrate the meter readings with the exact strata at which the cuttings originated, a time lag device 130 is connected in driven relation with the shaft 132. The time lag device 130 is mounted between the accumulated depth recorder 134 and the tape recorder 116. The time lag device allows the time lag (the time it takes the cuttings to come up the hole after they have been cut) to be calculated by formula and the time lag device set in order to have the recorder system 116 record the analysis of the mud and the cuttings on the record chart opposite the depth of which they were drilled.

The depth recorder 134 constantly registers the exact total depth while the recorder 110 constantly indicates the rate of drilling. The cuttings pass into the analyzer at a time after they are cut and the time can be easily calculated for any particular well and the time lag adjuster 130 set to record on the chart 126 the depth at which the cuttings undergoing analysis originated.

Actuating power for the entire device may be produced by an electric motor 140 which drives the shaft 142, to which the various devices such as the pumps 12, 58, the shaker 56 and the crusher 72 and agitator 76 are connected by suitable means such as belts.

In the operation of the device the pump 12 delivers the mud from the top of the well to the gas and mud separator, where the gases in the mud are freed and delivered to an analyzer which constantly analyzes hydrocarbon content of the mud. The cuttings are then removed from the mud which is then returned for use in the well while the cuttings themselves are delivered to a crusher and agitator where the occluded gases or other hydrocarbons in the cuttings are liberated and again passed to an analyzer which constantly analyzes the content of the cuttings so that the cuttings as well as the gas contained in the mud are constantly analyzed and recorded. Likewise, the hydrocarbon content of the remaining cutting are analyzed by means of the fluorescent process and also recorded together with the depth of the strata from which they are recovered.

It will thus be seen that this provides a convenient, compact and easily operated device for continuously logging a well and to understand the hydrocarbon content of the various strata through which the well passes.

For purposes of exemplification a particular embodiment of the invention has been shown, and described according to the best present understanding thereof. It will be apparent to those skilled in the art that many changes and modifications can be made herein without departing from the true spirit of the invention.

Having described the invention, what is claimed as new is:

1. In a well logging apparatus, for determining the hydrocarbon content of the strata penetrated by a well drilling device, a gas and mud separator comprising means receiving the drilling mud returned from the well, a chamber, a cylinder rotatably mounted on a vertical axis in said chamber, a plurality of radial vanes on said cylinder, a plurality of baffles mounted in said chamber below said cylinder, means delivering said drilling mud into said chamber, said mud being delivered laterally against said cylinder, the vanes of said cylinder dividing said mud into slugs, said slugs flowing from said cylinder over said baffles, tubular means communicating with said chamber and adapted for collecting the hydrocarbons freed from said mud.

2. For use with a well drilling system returning drilling mud containing the drill cuttings from the well hole, an apparatus for logging the hydrocarbon content of the strata traversed by the hole comprising a gas separating chamber, a vertically disposed cylinder journaled in said chamber, a plurality of radially disposed vanes on said cylinder, means for discharging the returning drilling mud and the contained drill cuttings against the side of said cylinder, a plurality of frusto-conical baffles arranged to receive the mud falling from said cylinder, a substantially conical bottom in said chamber, a mud outlet pipe secured to said bottom, tubular means communicating with said chamber and adapted to collect the hydrocarbons separated from said mud and the contained drill cuttings.

3. For use with a well drilling system utilizing circulating drilling mud to remove drill cuttings from a well; a well logging apparatus comprising a gas and mud separator including a substantially closed container, a vertically disposed cylinder rotatably mounted in said container, a plurality of spaced apart longitudinally disposed vanes mounted on the upper portion of said cylinder and projecting radially outward therefrom, an annular sloping baffle mounted below said cylinder and said vanes, a pump operative to deliver the well mud and the entrained drill cuttings laterally of the cylinder and against said vanes to rotate the cylinder, tubular means communicating with said container and adapted to collect the hydrocarbons separated from said mud and said drill cuttings, a mud discharge passage communicating with said container.

4. For use with a well drilling system utilizing circulating drilling mud to remove drill cuttings from a well; a well logging apparatus comprising a gas and mud separator including a substantially closed container, a vertically disposed cylinder rotatably mounted in said container, a plurality of spaced apart longitudinally disposed vanes mounted on the upper portion of said cylinder and projecting radially outward therefrom, an annular sloping baffle mounted below said cylinder and said vanes, a pump operative to deliver the well mud and the entrained drill cuttings laterally of the cylinder and against said vanes to rotate the cylinder, tubular means communicating with said container and adapted to collect the hydrocarbons separated from said mud and said drill cuttings, a mud discharge passage communicating with said container, a hydrocarbon anaylzer, said tubular means conveying the collected hydrocarbons from said gas and mud separator to said hydrocarbon analyzer.

5. For use with a well drilling system utilizing circulating drilling mud to remove drill cuttings from a well; a well logging apparatus comprising a gas and mud separator including a substantially closed container, a vertically disposed cylinder rotatably mounted in said container, a plurality of spaced apart longitudinally disposed vanes mounted on the upper portion of said cylinder and projecting radially outward therefrom, an annular sloping baffle mounted below said cylinder and said vanes, a pump operative to deliver the well mud and the entrained drill cuttings laterally of the cylinder and against said vanes to rotate the cylinder, tubular means communicating with said container and adapted to collect the hydrocarbons separated from said mud and said drill cuttings, a mud discharge passage communicating with said container, a hydrocarbon analyzer, said tubular means conveying the collected hydrocarbons from said gas and mud separator to said hydrocarbon analyzer, said hydrocarbon analyzer being operative to determine the quantity of hydrocarbons separated from said mud, a recording device logging the quantities determined by said hydrocarbon analyzer.

6. In a well logging apparatus operative to determine the hydrocarbon content of the strata penetrated by a well drilling device utilizing drilling mud to remove drill cuttings from a well, a hydrocarbon collector comprising means operative to separate the drill cuttings from the drilling mud, a plurality of superposed pairs of crushing rolls, said means delivering said drill cuttings into said rolls, an agitator including a plurality of rotating knife blades mounted below said crushing rolls, said rolls delivering crushed cuttings to said blades, pick up tubes positioned to collect hydrocarbons released in said crusher.

7. In a well logging apparatus operative to determine the hydrocarbon content of the strata penetrated by a well drilling device utilizing drilling mud to remove drill cuttings from a well, a hydrocarbon collector comprising means operative to separate the drill cuttings from the drilling mud, a plurality of superposed pairs of crushing rolls, said means delivering said drill cuttings into said rolls, an agitator including a plurality of rotating knife blades mounted below said crushing rolls, said rolls delivering crushed cuttings to said blades, pick up tubes positioned to collect hydrocarbons released in said crusher, a hydrocarbon analyzer, said pick up tubes delivering the hydrocarbons collected in said crusher to said analyzer, said analyzer being operative to determine the quantity of hydrocarbons collected in said crusher, a recording device operatively connected to log the quantities determined by said analyzer.

8. A well logging apparatus operative to log the hydrocarbon content of the strata penetrated by a well drilling device utilizing circulating drilling mud to remove drill cuttings from the well, comprising means receiving the drilling mud and the contained drill cuttings returned from the well, a chamber, a cylinder rotatably mounted about a vertical axis in said chamber, a plurality of vertically disposed vanes on said cylinder projecting radially outward therefrom, a plurality of frusto-conical baffles mounted below and substantially coaxial with said cylinder, a pump delivering said drilling mud and the contained drill cuttings from said receiving means into said chamber, said mud being delivered laterally of said cylinder, said mud impinging against the vanes on said cylinder, said vanes dividing said mud into slugs, said slugs flowing from said cylinder over said baffles, tubular means communicating with said chamber and collecting the hydrocarbons separated from said mud, a mud discharge passage communicating with said chamber.

9. A well logging apparatus operative to log the hydrocarbon content of the strata penetrated by a well drilling device utilizing circulating drilling mud to remove drill cuttings from the well, comprising means receiving the drilling mud and the contained drill cuttings returned from the well, a chamber, a cylinder rotatably mounted about a vertical axis in said chamber, a plurality of vertically disposed vanes on said cylinder projecting radially outward therefrom, a plurality of frusto-conical baffles mounted below and substantially coaxial with said cylinder, a pump delivering said drilling mud and the contained drill cuttings from said receiving means into said chamber, said mud being delivered laterally of said cylinder, said mud impinging against the vanes on said cylinder, said vanes dividing said mud into slugs, said slugs flowing from said cylinder over said baffles, tubular means communicating with said chamber and collecting the hydrocarbons separated from said mud, a mud discharge passage communicating with said chamber, a hydrocarbon analyzing device, said tubular means delivering the hydrocarbons collected from said chamber to said hydrocarbon analyzing device, said analyzing device being operative to determine the quantity of hydrocarbons delivered thereto, a recording device operatively connected to said hydrocarbon analyzing device to log the quantities determined by said analyzing device.

References Cited in the file of this patent

UNITED STATES PATENTS

| Number | Name | Date |
|---|---|---|
| 382,973 | Groat | May 15, 1888 |
| 2,206,922 | Smith | July 9, 1940 |
| 2,213,138 | Hayward | Aug. 27, 1940 |
| 2,243,176 | Vander Henst | May 27, 1941 |
| 2,266,586 | Branum | Dec. 16, 1941 |
| 2,297,939 | Campbell | Oct. 6, 1942 |
| 2,341,169 | Wilson et al. | Feb. 8, 1944 |
| 2,459,944 | Jones et al. | Jan. 25, 1949 |
| 2,622,694 | Pryor | Dec. 23, 1952 |